United States Patent
Bloms et al.

(10) Patent No.: US 8,336,292 B2
(45) Date of Patent: Dec. 25, 2012

(54) EXHAUST COMPONENT HAVING PERMANENTLY ASSOCIATED LIFE INDICATOR

(75) Inventors: Jason K. Bloms, Edwards, IL (US); Mohamed Daoud, Dunlap, IL (US); Antony J. Eager, Peterborough (GB); Kevin D. Ehrenhardt, Eureka, IL (US); Tazio S. Grivetti, Chillicothe, IL (US); David J. Kapparos, Chillicothe, IL (US); Matthew E. Leustek, Metamora, IL (US); Anthony C. Rodman, Langtoft (GB); Richard Severns, II, Chillicothe, IL (US); Yanchai Zhang, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 862 days.

(21) Appl. No.: 12/292,094

(22) Filed: Nov. 12, 2008

(65) Prior Publication Data

US 2010/0115920 A1    May 13, 2010

(51) Int. Cl.
*F01N 11/00* (2006.01)

(52) U.S. Cl. .............................. 60/277; 60/297; 60/311

(58) Field of Classification Search ............... 60/277, 60/297, 311; 218/157; 116/206; 422/88; 702/182; 340/635
See application file for complete search history.

(56) References Cited

U.S. PATENT DOCUMENTS

| | | | |
|---|---|---|---|
| 3,639,998 A | 2/1972 | Mason | |
| 4,382,700 A | 5/1983 | Youngren | |
| 5,351,035 A | 9/1994 | Chrisco | |
| 5,785,844 A | 7/1998 | Lund et al. | |
| 6,074,463 A | 6/2000 | Lee et al. | |
| 6,297,742 B1* | 10/2001 | Canada et al. | 340/635 |
| 6,300,585 B1* | 10/2001 | Nicolai et al. | 218/1 |
| 6,327,902 B1 | 12/2001 | Berry, III et al. | |
| 6,651,422 B1 | 11/2003 | LeGare | |
| 6,976,448 B2 | 12/2005 | Krisko et al. | |
| 7,012,685 B1 | 3/2006 | Wilson | |
| 7,231,291 B2 | 6/2007 | Dollmeyer et al. | |
| 7,260,930 B2 | 8/2007 | Decou et al. | |
| 7,299,689 B2 | 11/2007 | Audoin | |
| 7,360,433 B2 | 4/2008 | Janik et al. | |
| 7,380,452 B1 | 6/2008 | Sarshar et al. | |
| 7,406,864 B1 | 8/2008 | Sarshar et al. | |

(Continued)

FOREIGN PATENT DOCUMENTS

JP    03-226294 A    10/1991

(Continued)

OTHER PUBLICATIONS

International Search Report and Written Opinion mailed Jun. 22, 2010, for corresponding PCT International Application No. PCT/US2009/064124.

*Primary Examiner* — Thomas Denion
*Assistant Examiner* — Jorge Leon, Jr.
(74) *Attorney, Agent, or Firm* — Finnegan, Henderson, Farabow, Garrett & Dunner LLP

(57) ABSTRACT

An exhaust component for use with a combustion engine is disclosed. The exhaust component may have a housing at least partially defining an inlet and an outlet, and a treatment device supported by the housing in communication with exhaust passing from the inlet to the outlet. The exhaust component may also have a life indicator permanently associated with at least one of the housing and the treatment device.

27 Claims, 2 Drawing Sheets

U.S. PATENT DOCUMENTS

| | | |
|---|---|---|
| 2005/0127040 A1* | 6/2005 | Franklin et al. ................ 218/12 |
| 2006/0260534 A1 | 11/2006 | Petrakis |
| 2007/0068147 A1 | 3/2007 | Sun et al. |
| 2007/0144146 A1* | 6/2007 | Kusatsugu ....................... 60/277 |
| 2007/0183932 A1* | 8/2007 | Adair et al. ...................... 422/88 |
| 2008/0059116 A1* | 3/2008 | Johansson et al. ............ 702/182 |
| 2008/0141928 A1* | 6/2008 | Adair et al. .................... 116/206 |
| 2008/0201054 A1 | 8/2008 | Grichnik et al. |
| 2008/0217298 A1* | 9/2008 | Borchardt et al. ............ 218/157 |

FOREIGN PATENT DOCUMENTS

| | | |
|---|---|---|
| JP | 07-026938 A | 1/1995 |

* cited by examiner

EXHAUST COMPONENT HAVING PERMANENTLY ASSOCIATED LIFE INDICATOR

TECHNICAL BACKGROUND

The present disclosure is directed to an exhaust component and, more particularly, to an exhaust component having a permanently associated life indicator.

BACKGROUND

Fluid handling components, for example filters and catalysts, are used to treat or condition passing fluid. These components often include fluid-treating coatings and/or substrates that degrade or are consumed and, as such, must be periodically replaced. In some situations, these components can be inadvertently exposed to extreme pressure, temperature, vibration, and/or caustic conditions that damage the components such that they need to be replaced prematurely.

An exemplary fluid handling system is described in U.S. Pat. No. 5,785,844 (the '844 patent) issued to Lund et al. on Jun. 28, 1998. The '844 patent discloses an end-of-life mechanism for use with a water treatment cartridge. The end-of-life mechanism includes a housing with at least one opening for the passage of water to a chamber, formed by the interior of the housing and the cartridge. The chamber includes a support member mounted to the housing. A float is rotationally mounted on the support member to limit float movement to a predetermined distance upon each rotation of the float, resulting from each cycle of the cartridge. Once the float has made a specific number of rotations and has travelled the complete distance of the support member as water fills and drains from the chamber, the float rests in a position where it is visible through an opening in the housing, indicative of the end of life of the cartridge.

SUMMARY

One aspect of the present disclosure is directed to an exhaust component. The exhaust component may include a housing at least partially defining an inlet and an outlet, and a treatment device supported by the housing in communication with exhaust passing from the inlet to the outlet. The exhaust component may also include a life indicator permanently associated with at least one of the housing and the treatment device.

Another aspect of the present disclosure is directed to a method of indicating life of an exhaust component. The method may include monitoring an operational condition of the exhaust component, and equating the monitored operational condition to a life of the exhaust component. The method may also include permanently maintaining information associated with the life of the exhaust component with the exhaust component.

DETAILED DESCRIPTION

Figure 1:
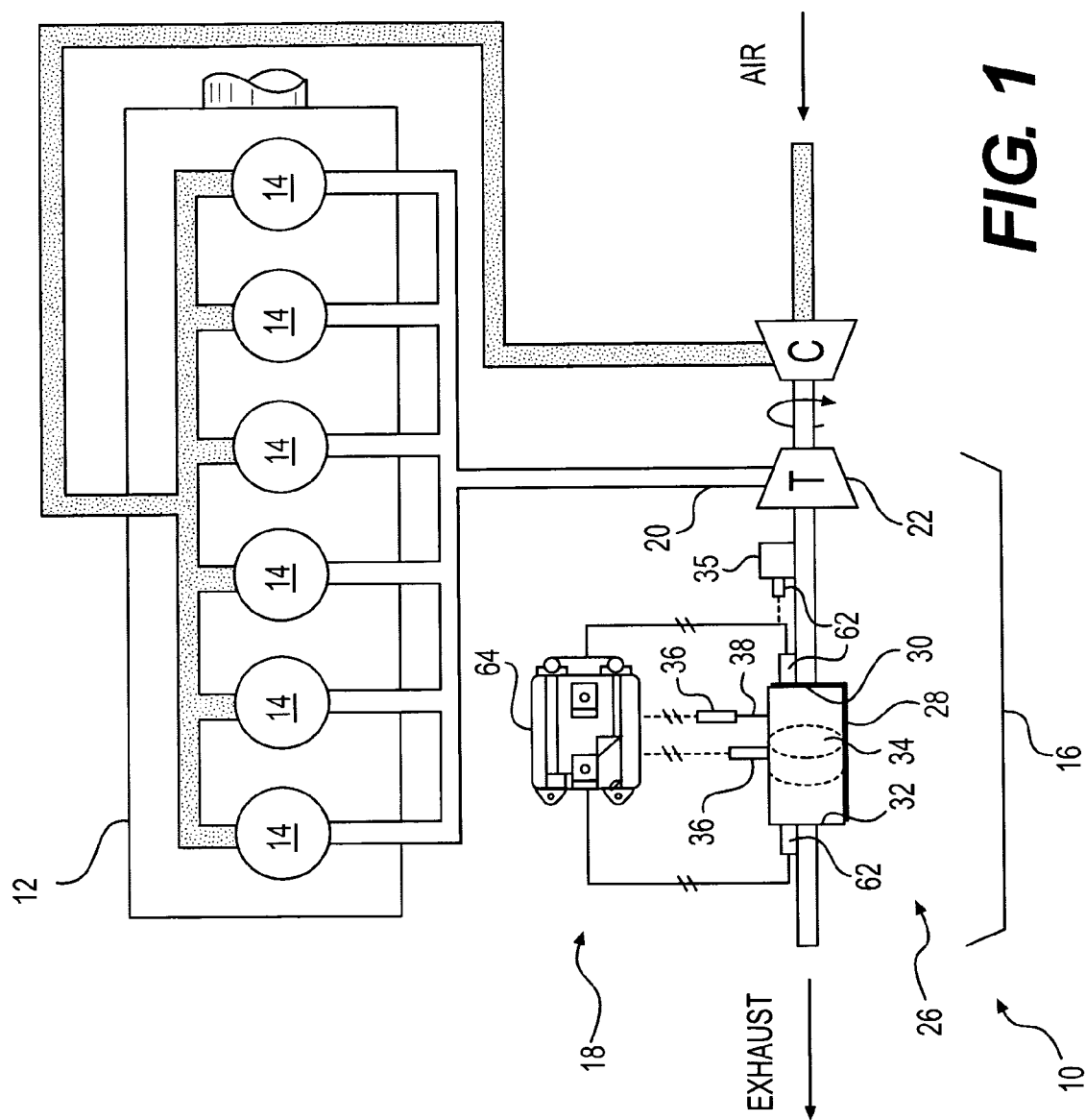
FIG. 1 is a schematic and diagrammatic illustration of an exemplary disclosed power system.

FIG. 1 illustrates an exemplary power system 10. For the purposes of this disclosure, power system 10 is depicted and described as a diesel-fueled, combustion engine. However, it is contemplated that power system 10 may embody any other type of combustion engine, such as, for example, a gasoline, a liquefied coal, or a gaseous fuel-powered engine. Power system 10 may include an engine block 12 at least partially defining a plurality of cylinders 14, and a plurality of piston assemblies (not shown) disposed within cylinders 14. It is contemplated that power system 10 may include any number of cylinders 14 and that cylinders 14 may be disposed in an "in-line" configuration, a "V" configuration, or in any other conventional configuration.

Multiple separate sub-system may be included within power system 10 to support combustion processes in cylinders 14. Among others, power system 10 may include an exhaust system 16, and a control system 18. Exhaust system 16 may exhaust byproducts of the combustion process to the atmosphere. Control system 18 may regulate operation of exhaust system 16 to reduce the discharge of regulated constituents to the atmosphere.

Exhaust system 16 may include components configured to condition and direct exhaust from cylinders 14 to the atmosphere. For example, exhaust system 16 may include an exhaust passageway 20, one or more turbines 22 driven by exhaust flowing through passageway 20, and one or more exhaust components 26 fluidly disposed within passageway 20 and connected downstream of turbine 22 to treat and/or condition exhaust before discharge to the atmosphere. It is contemplated that exhaust system 16 may include different or additional components than described above such as, for example, bypass components, braking components, attenuation devices, and other known components, if desired.

Turbine 22 may be located to receive exhaust leaving power system 10, and may be connected to one or more compressors of by way of a common shaft to form a turbocharger. As the hot exhaust gases exiting power system 10 move through turbine 22 and expand against vanes (not shown) thereof, turbine 22 may rotate and drive the connected compressor to pressurize inlet air. It is contemplated that turbine 22 may be omitted, if a naturally-aspirated power system is desired.

Exhaust component 26 may receive exhaust from turbine 22 and condition constituents of the exhaust. As shown in FIG. 1, exhaust component 26 may include a housing 28 at least partially defining an inlet 30 and an outlet 32, and one or more treatment devices 34 supported by housing 28. Inlet 30 may be connected to receive exhaust from turbine 22 and direct the exhaust into housing 28. Outlet 32 may be connected to direct exhaust from housing 28 to the atmosphere. Each treatment device 34 may be in fluid communication with exhaust as it passes from inlet 30 to outlet 32.

Treatment device 34 may embody any device known in the art for converting, reducing, removing, trapping, absorbing, adsorbing, filtering, cooling, or otherwise conditioning exhaust constituents. Treatment device 34 may include, among other things, a particulate filter (e.g., a diesel particulate filter or DPF), a catalyzed particulate filter (e.g., a catalyzed diesel particulate filter or CDPF), an oxidation catalyst (e.g., a diesel oxidation catalyst or DOC), a reduction catalyst (e.g., selective catalyst reduction device or SCR device), a cleanup catalyst (e.g. ammonia oxidation catalyst or AMOX), a constituent absorber or adsorber (e.g., a NOx absorber or adsorber), and/or other known treatment device. As such, treatment device 34 may generally consist of a metallic or ceramic substrate having, in some embodiments, a catalyst material coated on, impregnated within, or otherwise associated with the substrate. As exhaust passes near and/or through the substrate, constituents of the exhaust may be converted, reduced, removed, trapped, absorbed, adsorbed, filtered, cooled, or otherwise conditioned such that exhaust discharged to the atmosphere contains a desired amount of the constituents.

During operation, as exhaust passes near or through treatment device 34 and constituents thereof are conditioned, the catalyst material within the substrate and/or the substrate itself may be consumed or degraded. And, eventually, the amount of catalyst material and/or substrate remaining within treatment device 34 may be insufficient to adequately condition the constituents. In this situation, exhaust component 26 may be replaced.

In one embodiment, a heating device 35 may be associated with treatment device 34. Heating device 35 may be situated to selectively increase the temperature of treatment device 34 to promote operation thereof. For example, heating device 35 may promote regeneration of a particulate filter (i.e., to promote the burning away of the collected particulate matter), or increase the temperature of treatment device 34 into an optimal operational range. As such, heating device 35 may embody, for example, a fuel-fired burner, an electric grid, or other similar device known in the art that is configured to selectively heat the exhaust flowing through treatment device 34. Alternatively, heating device 35 could be situated to directly heat treatment device 34, if desired.

During servicing of an exhaust system, it is possible for a component of one system to be removed from that system and then be replaced within the same or a different system. And, because it can be difficult for a technician performing the service to determine how much usable life remains in the component, it may be possible for a used component with little or no remaining life to be unknowingly reinstalled. Alternatively, it may be possible for a component having significant remaining life to be prematurely discarded. Thus, a way to effectively determine component life and minimize improper reuse or discard is desired.

To help track the life of exhaust component 26 (i.e., the amount of catalyst material or substrate consumed or remaining, or an amount of time since use began or until replacement is suggested or required), a life indicator 36 may be permanently associated with housing 28 and/or to treatment device 34. In one example, life indicator 36 may be connected directly to housing 28 and/or to treatment device 34. In another example, life indicator 36 may be indirectly connected by way of a tether 38, such that life indicator 36 may be located somewhat remotely from exhaust component 26 to help shield life indicator from extreme conditions.

As shown in FIGS. 2-7, life indicator 36 may be configured to provide a mechanical, chemical, and/or electrical indication of the useful life of exhaust component 26. In one embodiment, the indication may be associated with an amount of life that has been consumed. In another embodiment, the indication may be associated with an amount of useful life remaining before replacement is suggested.

Figure 2:
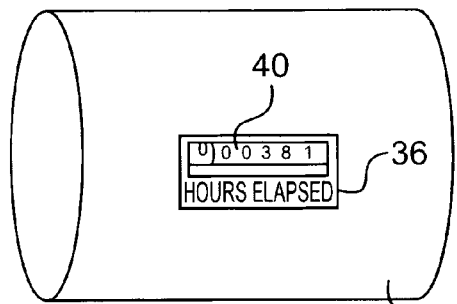
FIG. 2 is a diagrammatic illustration of an exemplary disclosed exhaust component that may be used in conjunction with the power system of FIG. 1.

FIG. 2 illustrates an exemplary mechanical embodiment of life indicator 36. In this example, life indicator 36 may be a counter, for example an hour meter (or a meter associated with another block of time, for example a minute meter or a 20 hour block meter). It is contemplated that, as a mechanical counter, life indicator 36 could be battery powered, powered by way of an external lead (not shown), self powered via vibration and movement, powered via a pre-wound spring (not shown), or powered in any other manner. As a counter, life indicator 36 may be configured to advance a numerical dial arrangement 40 or otherwise visually display time or blocks of time in response to monitored operation of exhaust component 26.

In one example, the monitored operation may be associated with an elapsed period of time and/or a performance parameter of exhaust component 26. In particular, life indicator 36 may be configured to advance numerical dial arrangement 40 every hour, every hour of engine operation, every hour of engine operation when a temperature of treatment device 34 exceeds a desired temperature range, every hour of engine operation when a vibration of treatment device 34 exceeds a desired vibration level, etc. Alternatively, life indicator 36 may be configured to advance the numerical dial arrangement 40 each time the temperature or vibration of treatment device 34 exceeds the desired temperature range or vibration level, regardless of time. In any of these scenarios, life indicator 36 may monitor an operation of exhaust component 26, equate or index the monitored operation to the life of exhaust component 26, and display the life consumed and/or the life remaining of exhaust component 26. It is contemplated that life indicator 36, in one example, may be a variable resistance device, which can be tuned to reflect hours or another suitable block of time, if desired.

Figure 3:
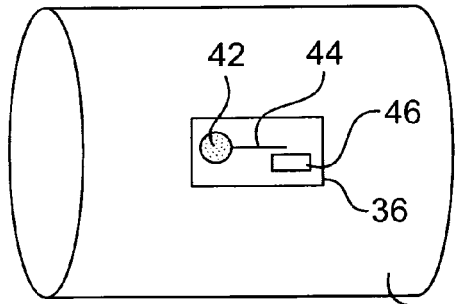
FIG. 3 is a diagrammatic illustration of an exemplary disclosed exhaust component that may be used in conjunction with the power system of FIG. 1.

FIG. 3 illustrates another exemplary mechanical embodiment of life indicator 36. In this example, life indicator 36 may include a bimetallic wear mechanism. Specifically, life indicator 36 may include a spring coil 42 fabricated from a first metal and having a protruding tang 44. As spring coil 42 warms during operation of exhaust component 26, spring coil 42 may expand and unwind, causing tang 44 to engage a wear plate 46 fabricated from a second metal. Over time, the engagement of tang 44 with wear plate 46 may cause wear plate 46 to erode away. And, this wear may be periodically measured and correlated to a life (consumed or remaining) of exhaust component 26.

Figure 4:
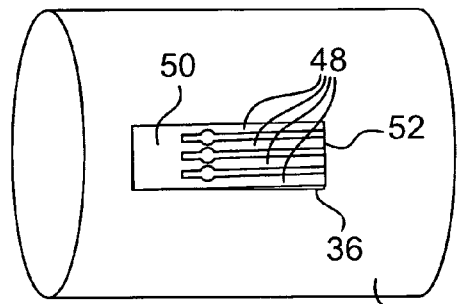
FIG. 4 is a diagrammatic illustration of an exemplary disclosed exhaust component that may be used in conjunction with the power system of FIG. 1.

FIG. 4 illustrates yet another exemplary mechanical embodiment of life indicator 36. In this example, life indicator 36 may include a mechanical fuse mechanism. In particular, life indicator 36 may include a series of metal strips 48 connected to exhaust component 26 at one end via a common base 50 and separately connected to exhaust component 26 at a distal end 52. Each metal strip 48 may have different cross-sectional geometry along its length that is associated with a fatigue strength of each strip. This geometry may be well-defined and correlated with a different expected operational time period based on cyclical heating and/or vibrations experienced by metal strips 48. When each time period is achieved, the associated metal strip 48 may have reached its fatigue limit and break. Because metal strips 48 may be directly connected to exhaust component 26, breakage thereof may correspond with an amount of life consumed or remaining for exhaust component 26. Thus, by visually observing which (or how many) metal strips 48 have broken, and which (or how many) remain, a value associated with the consumed or remaining life of exhaust component 26 may be determined.

Figure 5:
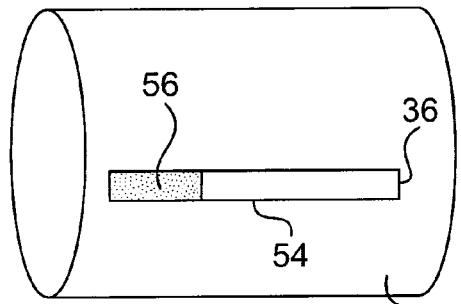
FIG. 5 is a diagrammatic illustration of an exemplary disclosed exhaust component that may be used in conjunction with the power system of FIG. 1.

FIG. 5 illustrates an exemplary chemical embodiment of life indicator 36. In this example, life indicator 36 may include a container 54 housing a fluid 56, for example a plastic, a wax, a paraffin, or an oil. During operation of power system 10 (referring to FIG. 1), as exhaust passing through exhaust component 26 heats up and warms treatment device 34 and/or housing 28, fluid 56 within container 54 may melt, evaporate, change color, and/or escape from container 54. When all of fluid 56 has melted, evaporated, changed color, and/or escaped from container 54, the useful life of exhaust component 26 may have expired. Thus, by observing the status of fluid 56, a life (consumed or remaining) of exhaust component 26 may be determined.

Figure 6:
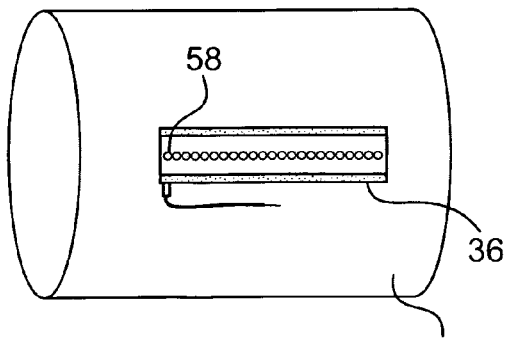
FIG. 6 is a diagrammatic illustration of an exemplary disclosed exhaust component that may be used in conjunction with the power system of FIG. 1.

FIG. 6 illustrates an exemplary electrical embodiment of life indicator 36. In this example, life indicator 36 may include a set of electrical fuses 58 connected in series to an external power source. Over time, as exhaust component 26 ages, pulses of power may be selectively directed to life indicator 36 that cause electrical fuses 58 to blow or otherwise short-circuit. These pulses may be sent based only on time, based on time at elevated temperatures, based on a maximum temperature being achieved, based on vibration, or based on any other operating condition of power system 10. It is contemplated that, as each fuse 58 blows, a indication of the status change of that fuse 58 may be visible. Thus, by visually observing which (or how many) fuses 58 have blown, and which (or how many) remain, a value associated with the consumed or remaining life of exhaust component 26 may be determined.

Figure 7:
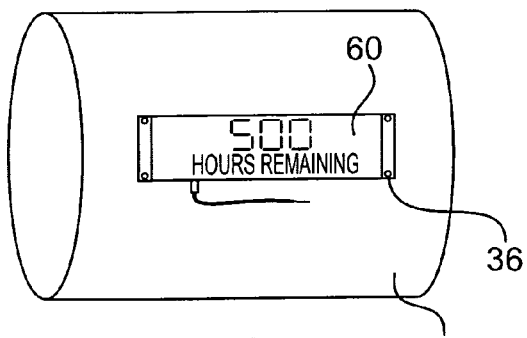
FIG. 7 is a diagrammatic illustration of an exemplary disclosed exhaust component that may be used in conjunction with the power system of FIG. 1.

FIG. 7 illustrates another exemplary electrical embodiment of life indicator 36. In this example, life indicator 36 may include an electrical counter or memory module 60. Memory module 60 may be configured to electrically retain and/or display information regarding the life (consumed or remaining) of life indicator 36 that has been received from an internal or external data source. The life information may be associated with an amount of operational time, operational time at temperature, number of excursions over a specified temperature, serial number, history of service (e.g., installation, removal, reinstallation), instructions, etc. In this manner, the life information may be observed, downloaded, and/or even used to control operation of power system 10 (e.g., used to inhibit or otherwise affect operation of power system 10 in response to an expired or nearly expired life of exhaust component 26).

In one embodiment, life indicator 36 may be non-resettable. Specifically, only operation of exhaust component 26 may affect the display of life indicator 36. In this manner, life indicator 36 of a used exhaust component 26 may be inhibited from being erroneously adjusted to read lower or higher than an actual life thereof.

Control system 18 may cooperate with life indicator 36 to facilitate effective use of exhaust component 26. In particular, control system 18 may include one or more sensory devices 62 configured to sense parameters associated with treatment device 34 and/or heating device 35, and a controller 64 in communication with sensory devices 62. In one embodiment, controller 64 may also be in communication with life indicator 36, if desired. Controller 64 may be configured to monitor, determine, and/or record information from sensory devices 62, and/or to update life indicator 36 in response to the information.

Controller 64 may embody a single or multiple microprocessors, field programmable gate arrays (FPGAs), digital signal processors (DSPs), etc. that include a means for monitoring, determining, recording, and/or controlling an operation of exhaust component 26, life indicator 36, and/or power system 10 in response to signals received from sensory devices 62. Numerous commercially available microprocessors can be configured to perform the functions of controller 64. It should be appreciated that controller 64 could readily embody a microprocessor separate from that controlling other non-exhaust related power system functions, or that controller 64 could be integral with a general power system microprocessor and be capable of controlling numerous power system functions and modes of operation. If separate from the general power system microprocessor, controller 64 may communicate with the general power system microprocessor via datalinks or other methods. Various other known circuits may be associated with controller 64, including power supply circuitry, signal-conditioning circuitry, actuator driver circuitry (i.e., circuitry powering solenoids, motors, or piezo actuators), communication circuitry, and other appropriate circuitry.

In one embodiment, each of sensory devices 62 may be temperature sensors configured to generate signals indicative of an exhaust temperature. Sensory devices 62 may be located anywhere within exhaust system 16 to generate the signals, for example, upstream of treatment device 34, in contact with treatment device 34, and/or downstream of treatment device 34. The temperature signals may be utilized by controller 64 to determine aging of treatment device 34, for example to determine if treatment device 34 has been exposed to extreme temperatures capable of causing damage such as cracking or melting. Controller 64 may also be configured to relate a time elapsed during elevated temperatures or vibrations, and associate aging of treatment device 34 with that time. Controller 64 may then communicate this information to life indicator 36 of FIGS. 6 and 7 (i.e., to electrically-based life indicators 36).

In another embodiment, one of sensory devices 62, for example the sensory device 62 located upstream of treatment device 34, may be a transmitter such as an RF transmitter, while the other of sensory devices 62, for example the sensory device 62 located downstream of treatment device 34, may be a receiver such as an RF receiver configured to receive signals sent from the RF transmitter. Controller 64 may be in communication with both of sensory devices 62 to compare characteristics of the transmitted signal with characteristics of the received signal. Based on the comparison, controller 64 may be configured to make determinations about treatment device 34, for example if treatment device 34 has been installed or is missing, a soot loading of treatment device 34, an amount of consumable material remaining, etc. Based on these determinations, controller 64 may equate the determinations to an aging of treatment device 34, and forward this information to life indicator 36.

INDUSTRIAL APPLICABILITY

The exhaust component of the present disclosure may be applicable to any exhaust system where permanent knowledge of component aging is important. This knowledge may be provided by way of life indicator 36 that is permanently attached to exhaust component 26.

Several advantages may be associated with exhaust component 26. For example, because life knowledge may be permanently associated with exhaust component 26, it may be less likely that a component with little or no remaining life may be unknowingly installed for continued use, or that a component with significant remaining life may be discarded.

Further, the exhaust component may be suited for most environments, even where extreme temperatures, pressures, vibrations, and/or corrosive agents are present.

It will be apparent to those skilled in the art that various modifications and variations can be made to the exhaust component of the present disclosure without departing from the scope of the disclosure. Other embodiments will be apparent to those skilled in the art from consideration of the specification and practice of the exhaust component disclosed herein. For example, although temperature sensors and RF sensors were discussed as being used by controller 64 to determine aging of treatment device 34, it is contemplated that controller 64 may communicate with additional and different sensory devices to determine aging, if desired. Further, while life indicator 36 has been described as capable of displaying a life (expired or remaining), it is contemplated that the life information may only or additionally be stored internally and accessible through a service tool that connects to life indicator 36, if desired. In addition, information other than life information may also be stored within and/or displayed by life indicator 36, if desired, such as part number identification, serial number information, and other tracking information. It is intended that the specification and examples be considered as exemplary only, with a true scope of the disclosure being indicated by the following claims and their equivalents.

What is claimed is:

1. An exhaust component, comprising:
 a housing at least partially defining an inlet and an outlet;
 a treatment device supported by the housing in communication with exhaust passing from the inlet to the outlet;
 a life indicator permanently associated with at least one of the housing and the treatment device, the life indicator being configured to provide an indication of a life of the treatment device based on a historical operating condition of the treatment device, the historical operating condition being associated with a temperature of the treatment device exceeding a threshold; and
 a control system configured to monitor the historical operating condition by counting each time the temperature exceeds the threshold.

2. The exhaust component of claim 1, wherein the life indicator is configured to mechanically indicate the life of the treatment device.

3. The exhaust component of claim 2, wherein the life indicator includes a mechanical counter.

4. The exhaust component of claim 1, wherein the life indicator is configured to electrically indicate the life of the treatment device.

5. The exhaust component of claim 4, wherein the life indicator includes either one of an electrical counter or a memory module.

6. The exhaust component of claim 4, wherein the life indicator includes a memory module configured to store information associated with the historical operating condition of the treatment device.

7. The exhaust component of claim 1, wherein the life indicator is configured to provide an indication of a useful life remaining in the treatment device.

8. The exhaust component of claim 1, wherein the life indicator is configured to provide an indication of a life of the treatment device already consumed.

9. The exhaust component of claim 1, wherein the life indicator is permanently attached by way of a tether.

10. The exhaust component of claim 1, wherein the life indicator is non-resettable.

11. The exhaust component of claim 1, wherein the life indicator is self-powered.

12. The exhaust component of claim 1, wherein the life indicator is configured to inhibit continued use of the exhaust component when a life of the treatment device has been substantially consumed.

13. The exhaust component of claim 1, wherein the treatment device is a particulate filter.

14. The exhaust component of claim 1, wherein the life indicator is further configured to equate the historical operating condition to the life of the treatment device.

15. The exhaust component of claim 1, wherein the life indicator is provided on an exterior surface of the exhaust component.

16. The exhaust component of claim 1, wherein the control system is further configured to monitor the historical operating condition by monitoring an elapsed time period of operation when the temperature exceeds the threshold.

17. The exhaust component of claim 16, wherein the control system comprises:
 a temperature sensor configured to sense the temperature; and
 a controller in communication with the temperature sensor, the controller being configured determine when the temperature exceeds the threshold and monitor the elapsed time period of operation when the temperature exceeds the threshold.

18. The exhaust component of claim 17, wherein the controller is further configured to:
 determine a life of the treatment device already consumed based on the monitored elapsed time period of operation when the temperature exceeds the threshold, and
 communicate the determined life of the treatment device already consumed to the life indicator.

19. A method of indicating life of an exhaust component, the method comprising:
 monitoring an operational condition of the exhaust component, the operational condition being associated with a vibration level exceeding a threshold, wherein monitoring the operational condition includes counting each time the vibration level exceeds the threshold;
 equating the monitored operational condition to a life of the exhaust component;
 permanently maintaining information associated with the life of the exhaust component with the exhaust component; and
 displaying the life of the exhaust component on an exterior surface of the exhaust component.

20. The method of claim 19, wherein displaying includes mechanically displaying.

21. The method of claim 19, wherein displaying includes electrically displaying.

22. The method of claim 19, wherein the life of the exhaust component includes a consumed life of the exhaust component.

23. The method of claim 19, wherein the life of the exhaust component includes a remaining life of the exhaust component.

24. The method of claim 19, wherein monitoring the operational condition includes monitoring an elapsed time period of operation when the vibration level exceeds the threshold.

25. A power system, comprising:
 an engine configured to combust fuel and generate a flow of exhaust;
 an exhaust passageway leading from the engine to the atmosphere;

a housing disposed within the exhaust passageway and at least partially defining an inlet and an outlet;

a particulate filter disposed within the housing between the inlet and the outlet;

a temperature sensor configured to determine a temperature of the particulate filter;

a controller in communication with the temperature sensor, the controller being configured to determine when the temperature exceeds a threshold; and a life indicator permanently connected to at least one of the housing and the particulate filter, the life indicator being configured to provide an indication of a life of the particulate filter based on the determination of when the temperature exceeds the threshold, wherein the controller monitors an elapsed time period of operation when the temperature exceeds the threshold, and the life indicator provides the indication of the life of the particulate filter based on the monitored elapsed time period.

26. The power system of claim 25, wherein the controller counts each time the temperature exceeds the threshold, and the life indicator provides the indication of the life of the particulate filter based on the count.

27. The power system of claim 25, wherein the life indicator is configured to provide an indication of a useful life remaining of the particulate filter or an indication of a life of the particulate filter already consumed.

* * * * *